(12) United States Patent
Sinatov (10) Patent No.: US 10,767,515 B2
(45) Date of Patent: Sep. 8, 2020

(54) METHOD FOR LIQUID AIR AND GAS ENERGY STORAGE

(71) Applicant: Stanislav Sinatov, Kiryat-Ono (IL)

(72) Inventor: Stanislav Sinatov, Kiryat-Ono (IL)

(*) Notice: Subject to any disclaimer, the term of this patent is extended or adjusted under 35 U.S.C. 154(b) by 161 days.

(21) Appl. No.: 16/109,884

(22) Filed: Aug. 23, 2018

(65) Prior Publication Data

US 2019/0063265 A1 Feb. 28, 2019

Related U.S. Application Data

(60) Provisional application No. 62/548,982, filed on Aug. 23, 2017.

(51) Int. Cl.
| | |
|---|---|
| *F01K 27/02* | (2006.01) |
| *F25J 1/00* | (2006.01) |
| *F17C 9/04* | (2006.01) |
| *F25J 1/02* | (2006.01) |
| *H02J 15/00* | (2006.01) |
| *F01L 15/10* | (2006.01) |

(Continued)

(52) U.S. Cl.
CPC ............ *F01K 27/02* (2013.01); *F01L 15/10* (2013.01); *F02B 29/04* (2013.01); *F02B 41/10* (2013.01); *F17C 9/04* (2013.01); *F25J 1/004* (2013.01); *F25J 1/0012* (2013.01); *F25J 1/0092* (2013.01); *F25J 1/0222* (2013.01); *F25J 1/0224* (2013.01); *F25J 1/0251* (2013.01); *H02J 15/003* (2013.01); *H02J 15/006* (2013.01); *F17C 2221/031* (2013.01); *F17C 2221/033* (2013.01); *F17C 2227/0309* (2013.01); *F17C 2265/05* (2013.01); *F17C 2265/066* (2013.01); *F17C 2265/07* (2013.01); *F17C 2270/0581* (2013.01); *F25J 2210/62* (2013.01); *F25J 2230/04* (2013.01); *F25J 2230/30* (2013.01)

(58) Field of Classification Search
CPC . F01K 27/02; F25J 1/0222; F25J 1/004; F25J 1/0251; F25J 1/0224; F25J 1/0012; F25J 1/0092; F25J 2210/62; F25J 2230/04; F25J 2230/30; H02J 15/006; H02J 15/003; F02B 41/10; F02B 29/04; F01D 15/10; F17C 9/04; F17C 2265/07; F17C 2265/066; F17C 2265/05; F17C 2227/0309; F17C 2221/033; F17C 2221/031; F17C 2270/0581
See application file for complete search history.

(56) References Cited

U.S. PATENT DOCUMENTS

9,523,312 B2 * 12/2016 Allam .................... F17C 9/04
10,473,029 B2 * 11/2019 Conlon ................... F02C 6/14
(Continued)

*Primary Examiner* — Michael C Zarroli (57) ABSTRACT

A method for liquid air and gas energy storage (LAGES) which integrates the processes of liquid air energy storage (LAES) and regasification of liquefied natural gas (LNG) at the import terminal through the exchange of thermal energy between the streams of air and natural gas (NG) in their gaseous and liquid states and includes harnessing the LNG as an intermediate heat carrier between the air streams being regasified and liquefied, recovering a compression heat from air liquefier for LNG regasification and utilizing a cold thermal energy of liquid air being regasified for reliquefaction of a part of send-out NG stream with its return to LNG terminal.

6 Claims, 3 Drawing Sheets

(51) Int. Cl.
*F02B 29/04* (2006.01)
*F02B 41/10* (2006.01)

(56) References Cited

U.S. PATENT DOCUMENTS

| | | | |
|---|---|---|---|
| 2003/0005698 A1* | 1/2003 | Keller | F01K 23/10 |
| | | | 60/643 |
| 2018/0100695 A1* | 4/2018 | Conlon | F02C 3/22 |
| 2020/0095932 A1* | 3/2020 | Conlon | F02C 3/22 |

* cited by examiner

METHOD FOR LIQUID AIR AND GAS ENERGY STORAGE

CROSS-REFERENCE TO RELATED APPLICATIONS

This application claims the benefits of U.S. Provisional Patent Application No. 62/548,982 titled "Method for Liquid Air and Gas Energy Storage" and filed on Aug. 23, 2017.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to the field of energy storage technologies, and more specifically to the methods enabling an improvement in the technologies intended for large-scale conversion and storage of electrical energy and liquefied natural gas (LNG) fuel. It further relates to the methods making possible to profitably integrate the Liquefied Natural Gas Storage and Re-gasification (LNGSR) and Liquid Air Energy Storage (LAES) technologies, as the first step to creation of a new efficient Liquid Air and Gas Energy Storage (LAGES) technique.

BACKGROUND OF THE INVENTION

A started transfer to the decarbonized power grids is based first of all on an increased use of the fossil fuels with reduced carbon content, such as natural gas (NG) in its gaseous and liquefied states. In the latter case an implication of the LNGSR terminals is constantly growing. As described in "Handbook of Liquefied Natural Gas" (by Saeid Makhatab, et al., Elsevier, Oxford, 2014), the LNGSR terminals perform the unloading and storage of the imported liquefied natural gas (LNG) and on-demand pumping, re-gasification and injection of the NO into transmission pipeline. According to report of the LNG-Worldwide Ltd. "Current Outlook for Global LNG to 2020 and European LNG Prospects" (September 2014), in 2013 the 104 existing LNGSR terminals in 29 countries have imported 237 MTPA of LNG fuel, providing at the time approximately 10% of the global gas consumption. Thereby, a volume of imported LNG is expected to grow by 2025 up to 500 MTPA.

On the other hand, a share of non-fossil and renewable (mainly wind and solar) energy sources in global electricity generation should be increased up to 11-12% by 2050 in the Blue Map scenario, according to "Prospects for Large-Scale Energy Storage in Decarbonized Power Grids", Working Paper, IEA 2009, whereas in the EU countries the average level of 20% should be reached already in 2020. However with a large share of renewables in energy mix, it becomes vitally critical to ensure the on-demand and reliable supply of electricity, taking into account a variable output of the renewable energy sources and a frequent both positive and negative unbalance between this output and a current demand for power. One of the possible ways for solving this problem is the use of large-scale energy storages in the decarbonized power grids. According to the mentioned IEA estimates, an installed capacity of such energy storages should be increased from 100 GW in 2009 up to 189-305 GW by 2050. The large-scale energy storages could also solve a problem of operating the base-load (mainly coal and nuclear) power plants without significant reduction in the output of their steam generators during off-peak (low demand for power) hours in electrical grids.

Amongst the known methods for energy storage able to accumulate a lot of energy and store it over a long time-period, the recently proposed methods for Liquid Air Energy Storage (LAES) (see e.g. U.S. Pat. No. 9,638,068 and U.S. Patent Application No. 2017/0016577) are distinguished by the freedom from any geographical, land and environmental constraints, inherent in such other methods for large-scale energy storage technologies as Pumped Hydroelectrical Storage and Compressed Air Energy Storage. As described in the U.S. patent application No. 2017/0016577, the LAES method may comprise the following processes: forming a process air stream as the mixed stream of dry and $CO_2$-free fresh air and recirculating air from the LAES system, compressing the process air in the multi-stage and inter-cooled compressor train with use of power from the electrical grid during LAES charge, liquefying a process air in the processes of its deep aftercooling, depressurizing a liquid air with forming the resulting charging liquid air and recirculating air, and storing the resulting liquid air in the storage tank with succeeding on-demand pumping, re-gasifying and expanding the stored air stream in the multi-stage expander train of the LAES system, accompanied by super-heating and reheating a said air stream before and during its expanding with delivering the produced power into the electrical grid.

The LAES systems are characterized by much simpler permitting process and a possibility for co-location with any available sources of natural or artificial, cold or/and hot thermal energy, which may be used for enhancement of their power output and/or round-trip efficiency. One of such methods for integrations between the LAES system and the LNGSR terminal is described in the UK Patent Application No. GB 2512360, wherein a cold thermal energy of re-gasified LNG stream is proposed to use for significant reduction in power consumed during LAES charge mode. However, as evident from the report of Centre for Low Carbon Future "Liquid Air in the Energy and Transport Systems", May 2013, a round-trip efficiency of the proposed integrated system still does not exceed 60-61%. This results from a not sufficiently recovered cold potential of the LNG stream and fully untapped cold potential of the process air escaped the LAES system during its discharge mode. In addition, in the discussed technical solution a provision was not made for conformity of the technological processes of the LAES charge and LNGSR terminal discharge, which may run at different times with use of 'common-share' equipment.

The further improvements in performance of the LAES system integrated with LNGSR terminal are necessary to increase a round-trip efficiency of non-fueled LAGES facility above 65% and a round-trip efficiency of fueled LAGES facility above 130%. At the same time a need for further improvement in other LAGES performance has been revealed. First and foremost, this is concerned with the necessity for tangible increase in specific discharge power of the fueled LAGES facility. This aim may be achieved through a decrease in relationship between the flows of LNG being re-gasified and charging air being liquefied, which presently exceeds 1.5:1. There is also a need for performing the whole cycle of LNG processing (preheating-evaporation-superheating) in the integrated LAES system to fully remove from service the terminal equipment during LAES charge. It is expedient also to profitably recover a waste cold of the re-gasified air stream and a waste heat of the power generation equipment used in discharge of the fueled LAGES facility. This will result in significant increase in the round-trip efficiency of energy storage, obviate a need for bulk and expensive cold and hot thermal energy storage and drastically increase a specific power of the LAGES facility which may be discharged for each MTPA of the LNG terminal send-out capacity.

Combining a number of the different processes related to two energy conversion methods (LAES and LNGSR) makes possible to significantly reduce the energy losses in both technological chains: electrical power—liquid air—electrical power and NG—LNG—NG and correspondingly improve the performance of both mentioned chains.

SUMMARY OF THE INVENTION

In one or more embodiments, a proposed method for liquid air and gas energy storage (LAGES) may comprise in combination: a) delivering a liquefied natural gas (LNG) from a tank of a LNG Storage and Re-gasification (LNGSR) terminal into a co-located Liquid Air Energy Storage (LAES) facility for continuous re-gasifying the LNG at said LAES facility and final injecting a produced high-pressure natural gas (NG) into a transmission pipeline; b) interchanging a waste thermal energy between the LNG being re-gasified and a process air being continuously liquefied at the LAES facility; c) round-the-clock charging said LAES facility through consuming a grid power for continuous production of a liquid air with storing said liquid air only at the periods of a low demand for the grid power; and d) discharging the LAES facility, resulting in generating the grid power at the periods of a high demand for said grid power through consuming the liquid air both produced at said periods and stored at the LAES facility at the periods of the low demand for the grid power.

In so doing the improvements in said method may further provide in combination: a) delivering the LNG from the LNGSR terminal at a low pressure and a first low temperature during discharging the LAES facility; b) deep cooling a delivered LNG down to a second low temperature through recovering a minor part of a cold thermal energy of the liquid air consumed during discharging the LAES facility; c) controlled dividing a deeply cooled LNG into two parts, a first of which is immediately pumped at a high pressure and re-gasified at the LAES facility thus, forming the high-pressure NG produced during discharging said LAES facility; d) re-liquefying a portion of the high-pressure NG through recovering a major part of the cold thermal energy of the liquid air consumed during discharging the LAES facility; e) depressurizing and recycling at least a part of a re-liquefied NG into the tank of the LNGSR terminal; e) storing a second part of the deeply cooled LNG at said low pressure and said second low temperature at the periods of the high demand for the grid power; and f) pumping the second part of the deeply cooled LNG at said high pressure and re-gasifying it at the LAES facility thus, forming the high-pressure NG produced at the periods of the low demand for the grid power.

Using a proposed method, a relationship between the mass flowrates of said LNG being re-gasified and said liquid air being produced at the LAES facility may be maintained in the range of (1.05-1.15):1, whereas a share of the re-liquefied NG is provided in the range of 15-35% of a total amount of the high-pressure NG produced during charging said LAES facility.

For charging the LAES system the proposed method may further comprise: a) compressing a feed air stream in an intercooled feed air compressor set up to an intermediate charge cycle pressure; b) aftercooling and cleaning a pressurized feed air stream from the atmospheric water vapor and carbon dioxide components thus, forming a cleaned feed air stream; c) compressing a recirculating air stream in an uncooled recirculating air compressor set up to said intermediate charge cycle pressure; d) forming a stream of the process air through mixing the streams of the cleaned feed and the recirculating air at the intermediate charge cycle pressure; e) following compressing the process air stream in an intercooled process air compressor set up to a top charge cycle pressure; f) liquefying the process air stream by the deeply cooled LNG, resulting in re-gasifying the LNG and forming the high-pressure NG; g) following cooling a liquefied process air by the stream of the recirculating air escaped a liquid air separator; h) final cooling and depressurizing the liquefied process air in a liquid air expander, resulting in formation of a two-phase process air stream escaped said liquid air expander at a bottom charge cycle temperature and a bottom charge cycle pressure; i) separating the vapor and liquid phases of the two-phase process air in the liquid air separator tdius, forming the streams of the recirculating air and the liquid air; and j) storing the liquid air in a LAES facility tank at the periods of the low demand for the grid power or immediately consuming it at the periods of the high demand for the grid power.

In so doing, a compression heat extracted from the feed and process air streams may be recovered for superheating the high-pressure NG up to a minimal temperature required for injecting said high-pressure NG into a transmission pipeline, for which purpose a water or a water-glycol cooling medium transferring the compression heat to said high-pressure NG circulates in a closed loop and provides reducing a temperature of the feed and process air streams down to at least 10° C. at the outlet of any air-to-cooling medium heat exchangers in said closed loop.

For discharging the LAES system the proposed method may further comprise: a) consuming the liquid air delivered immediately from said liquid air separator and from the LAES facility tank with pumping said liquid air up to a top discharge cycle pressure; b) recovering the minor part of the cold thermal energy of the consumed liquid air for said deep cooling the delivered LNG down to the second low temperature, resulting in heating the consumed liquid air, c) recovering the major part of the cold thermal energy of the consumed liquid air for said re-liquefying the portion of the high-pressure NO, resulting in further heating and re-gasifying the consumed liquid air with forming a re-gasified air at the top discharge cycle pressure; d) final heating the re-gasified air by an exhaust gas escaped the LAES facility; e) partial expanding the re-gasified air in a high-pressure work-performing expander, resulting in generating the grid power; f) cooling the partially expanded re-gasified air and using it for supercharging a fueled reciprocating gas engine installed downstream of said high-pressure expander and for burning a fuel in said gas engine; g) operating the gas engine, resulting in generating the grid power and releasing the exhaust gas at an enhanced pressure and an enhanced temperature; h) expanding the exhaust gas in a low-pressure work-performing expander, resulting in generating the grid power, i) recovering a waste thermal energy of the exhaust gas escaped said low-pressure expander for the final heating the re-gasified air; and j) releasing the exhaust gas into the atmosphere.

In the proposed method a temperature of the exhaust gas at the inlet of said low-pressure expander may be increased through burning an additional fuel in a stream of said exhaust gas released from the gas engine.

BRIEF DESCRIPTION OF THE DRAWINGS

Embodiments will hereinafter be described in detail below with reference to the accompanying drawings, wherein lie reference numerals represent like elements. The accompanying drawings have not necessarily been drawn to scale. Where applicable, some features may not be illustrated to assist in the description of underlying features.

DETAILED DESCRIPTION OF THE INVENTION

The practical realization of the proposed method for liquid air and gas energy storage (LAGES) may be performed through the integration between the liquefied natural gas (LNG) storage and re-gasification (LNGSR) terminal and liquid air energy storage (LAES) system. At such LAGES facility the interchanging of a waste thermal energy between the LNG being re-gasified and partially re-liquefied and the air being liquefied and re-gasified provides a drastic increase in performance of the LAES system and LNGSR terminal alike.

Figure 1:
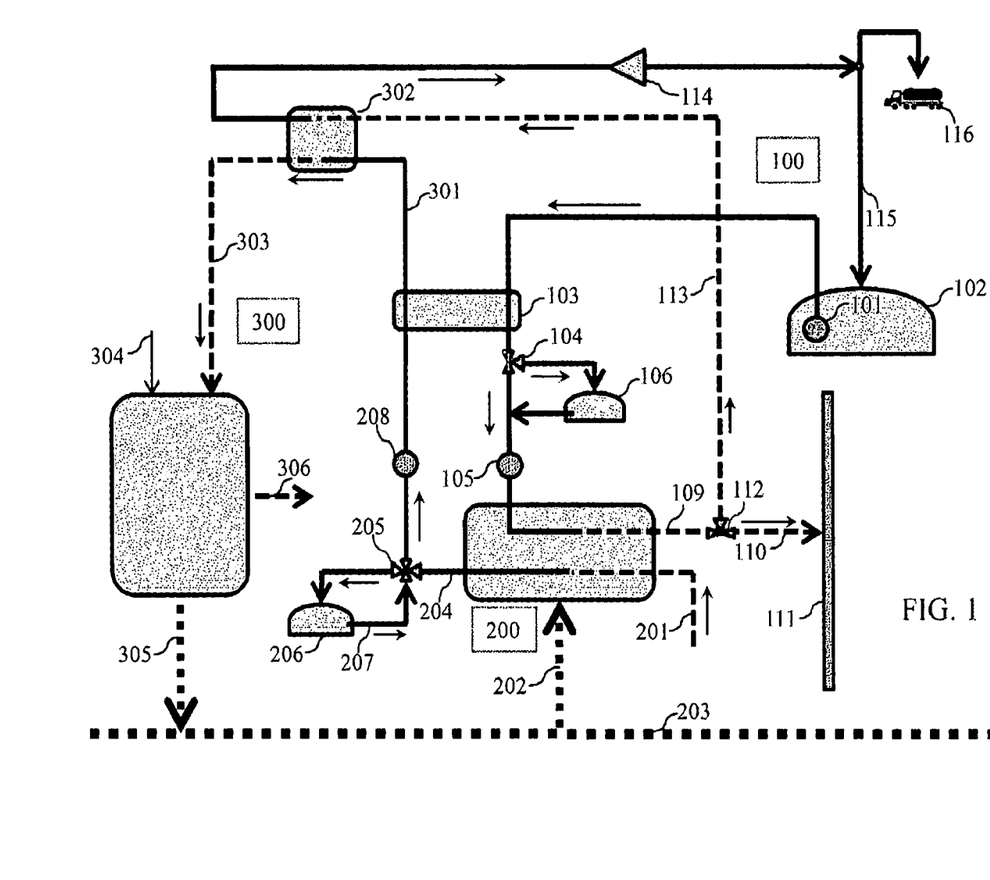
FIG. 1 is a schematic view of the first embodiment of the LAGES facility which may be designed for operation, according to the invented method.

The general principles of the LAGES facility operation are illustrated with the FIG. 1. At the periods of high demand for grid power the whole amount of LNG, which should be re-gasified at the periods of high and low demands for grid power, is pumped by low-pressure pump 101 from the storage tank 102 of LNGSR terminal 100. At a low pressure and the first low temperature this LNG stream is delivered into a LNG deep cooler 103, wherein the LNG temperature is reduced down to the second low one through a heat exchange with a discharged liquid air. The control valve 104 divides the deeply cooled LNG stream at the outlet of cooler 103 into two parts. The first part of this stream is pumped by the pump 105 up to a high pressure and delivered into a charge (CH) train 200 of the LAES facility. Here a heat exchange between the process air being liquefied and LNG stream being re-gasified is performed. The second part of deeply cooled LNG stream is delivered into LNG service tank 106 for storage at the period of high demand for grid power. A storage of the deeply cooled LNG in tank 106 may be performed under a pressure equal to the LNG pressure in a tank 101. For this purpose, the service tank 106 may be equipped with the LNG expander 107 and the low-pressure pump 108. Alternatively, a storage of the LNG in the tank 106 may be performed under a low pressure created by the pump 101. In the latter case a need for installation of the expander 107 and pump 108 is eliminated. In any case, at the period of low demand for grid power a pressure of the deeply cooled LNG is increased by the pump 105 from a low level up to the high one, at which the LNG is also directed to CH train 200 for re-gasification.

At the periods of low demands for grid power the re-gasified LNG escaped the CH train 200 in the form of the high-pressure natural gas (NG) is directed via the pipes 109 and 110 to the main NG pipeline 111. At the periods of high demands for grid power the high-pressure NG is divided by the control valve 112 into two streams. The basic stream 110 is injected into the main NG pipeline 111, whereas the stream 113 is directed to NG re-liquefier 302, wherein it is reconverted into the LNG stream, as described below.

Continuous charging the LAES facility is performed through a round-the-clock production of the liquid air in the CH train 200 at the periods of high and low demands for grid power. For this purpose, the train is supplied with feed air 201 from the atmosphere and electricity 202 from the grid 203. The energy intensity of air liquefaction is significantly reduced, resulting from the said heat exchange between the air stream being liquefied and LNG stream being re-gasified in the CH train 200. In so doing a mass flowrate relationship between these two streams should be maintained in the range of (1.05-1.15):1. The resultant liquid air product is delivered through a pipe 204 and control valve 205 into tank 206 for storage at the periods of low demands for grid power. Contrary to this, at the periods of high demands for grid power the liquid air delivered via the pipe 204 and the liquid air delivered via a pipe 207 from storage tank 206 are mixed in the control valve 205 and consumed for production of the grid power during discharging the LAES facility. For these purposes, the consumed liquid air is delivered by a high-pressure pump 208 into LNG deep cooler 103, wherein a minor part of a cold thermal energy of this air is transferred to the LNG stream being cooled. The liquid air escapes the LNG cooler 103 at a somewhat increased temperature and is delivered via a pipe 301 into said high-pressure NG re-liquefier 302, This equipment is used also as a liquid air re-gasifier, wherein a major part of the liquid air cold thermal energy is recovered for re-liquefying a part of the high-pressure NG extracted from the outlet of CH train 200 via the pipe 113.

The resultant high-pressure re-gasified air is directed via a pipe 301 to discharge (DCH) train 300 of the LAES facility, which is also supplied with a NG fuel via a pipe 302. The high demand power 303 produced by the DCH train 300 is delivered into grid 203, whereas the LAES exhaust gases are removed to the atmosphere via a pipe 304. A pressure of LNG escaped re-liquefier 114 is reduced in the LNG expander 115, after which the depressurized LNG may be returned into the storage tank 102 of LNGSR terminal via a pipe 116 or used for loading the trucks 117 and ship bunkering. In so doing, a share of the re-liquefied NG may be maintained in the range of 15-35% of the high-pressure NG produced during charging the LAES facility.

Figure 2:
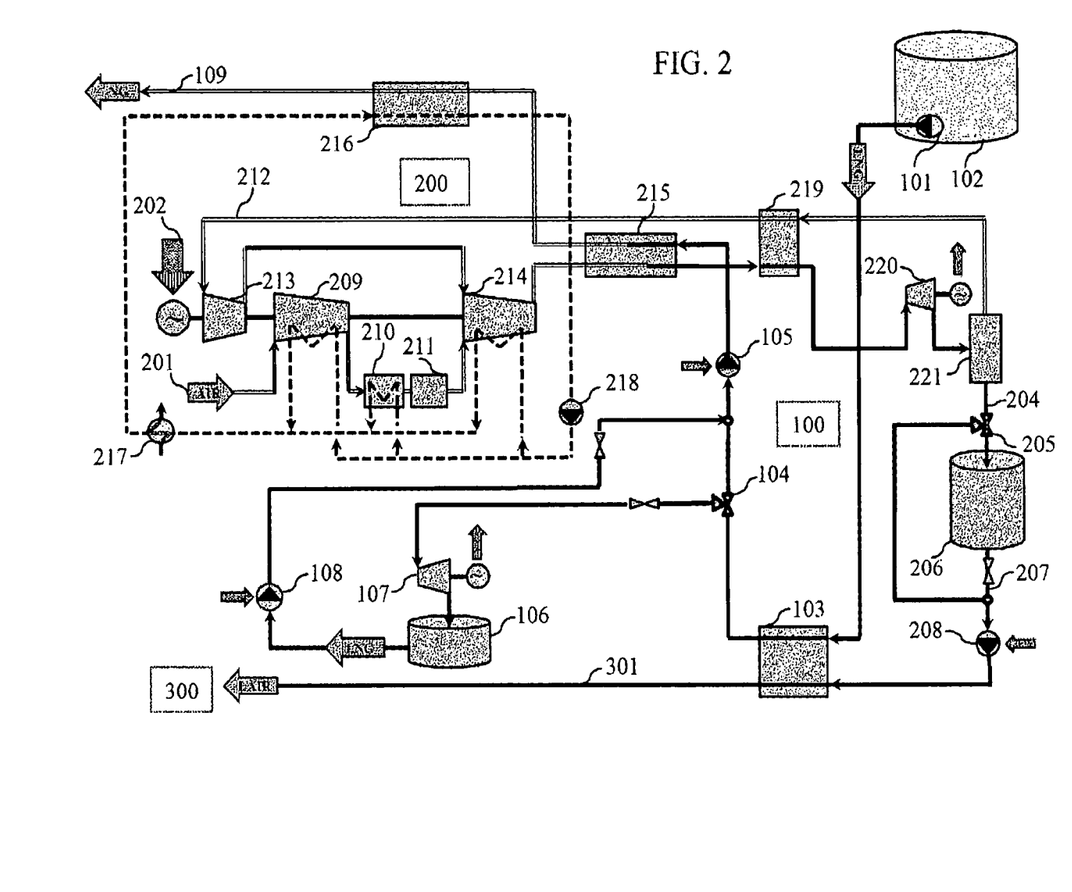
FIG. 2 is a schematic view of the LAGES charge train of second LAGES facility embodiment according to the invented method.

The general principles of charge (CH) train 200 operation are illustrated with the FIG. 2. Here, during discharging the LAES facility the whole amount of LNG, which should be re-gasified at the periods of high and low demands for grid power, is pumped by the low-pressure pump 101 from the tank 102 of LNGSR terminal 100. Tis LNG stream is delivered at the low pressure and first low temperature into LNG deep cooler 103, wherein its temperature is reduced down to the second low one through a heat exchange with discharged liquid air. The control valve 104 divides the deeply cooled LNG stream at the outlet of deep cooler 103 into two parts. The first part of this stream is delivered by the pump 105 to a high pressure into LNG re-gasifier 215 which is a part of CH train 200 of the LAES facility. The second part of deeply cooled LNG stream is delivered into the LNG service tank 106 for storage as described above. At the periods of low demands for grid power a stored LNG is pumped by the pump 105 up to the high pressure and delivered into LNG re-gasifier 215 of CH train 200.

The fresh feed air delivered via a pipe 201 is continuously pressurized by the intercooled compressor 209 up to an intermediate charge cycle pressure and aftercooled in air cooler 210 with following cleaning from the atmospheric $H_2O$ and $CO_2$ contaminants in the adsorber 211. In its turn a recirculating air delivered via a pipe 212 is pressurized by the uncooled compressor 213 up to the same intermediate charge cycle pressure. The process air, as the mixture of the feed and recirculating air streams, is pressurized by the intercooled compressor 214 from said intermediate up to atop charge cycle pressure, at which it is delivered into the process air liquefier/NG re-gasifier 215. A power 202 required for driving all the compressors is continuously delivered from the grid and may be alternatively extracted from the LAES facility output at the periods of high demands for grid power. In the LNG re-gasifier 215 a heat exchange between the high-pressure process air being liquefied and high-pressure LNG stream being re-gasified is performed. Through recovery of a compression heat in the CH train 200, a temperature of high-pressure NG stream escaped the re-gasifier 215 is further increased in the NG heater 216 up to a level required for injection of NG into gas network. For these purposes the CH train 200 is equipped with the closed cooling system, including the intercoolers of the air compressors 209 and 214, aftercooler 210, balance heat exchanger 217, said NG heater 216 and pump 218 and providing the circulation of water or water-glycol mixture through all mentioned equipment. A temperature of NG injected into gas network may be maintained at a level of 5÷15° C. with simultaneous provision of the air temperature at the inlet of all stages of the intercooled compressors at a level not exceeding 10° C.

The high-pressure liquid process air escaped the air liquefier 215 is further cooled in heat exchanger 219 by a stream of recirculating air and depressurized in the liquid air expander 220, resulting in final liquid air cooling down to a bottom charge cycle temperature at a bottom charge cycle pressure. The two-phase air stream at the expander outlet is divided in the air separator 221 into two streams: recirculating vapor air and liquid air. The recirculating air stream 212 is delivered through the heat exchanger 219 to the inlet of compressor 213. Control valve 205 installed at the outlet 204 of the separator 221 makes possible to select a required way for the following usage of the liquid air produced: either to deliver the liquid air into the storage tank 206 at the periods of low demands for grid power or to bypass the storage tank 206 at the periods of high demands for grid power. In the latter case the mixture of two liquid air streams (from the separator 221 and from storage tank 206) is delivered by the high-pressure pump 208 through LNG deep cooler 103 and via pipe 301 into DCH train 300. A heat transfer between the low-pressure LNG stream and high-pressure liquid air stream in the deep cooler 103 is performed without changes in phase of both streams and leads to cooling the LNG by approximately 10-15° C. and heating the liquid air by approximately 20-30° C. A deep cooling of LNG provides its sufficiently low temperature at the inlet of the air liquefier 215 that a high process air liquefaction ratio may be achieved in the CH train 200. The storage of a part of the deeply cooled LNG in the service tank 106 at the periods of high demands for grid power is described above.

Figure 3:
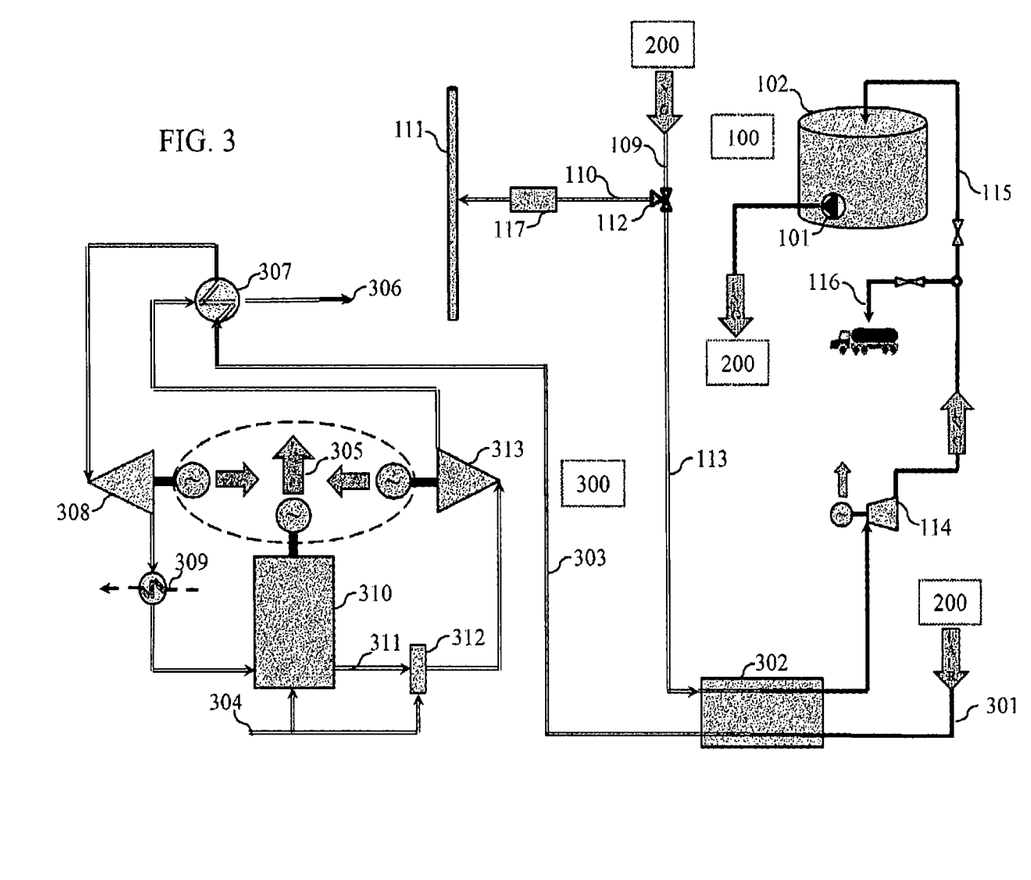
FIG. 3 is a schematic view of the LAGES discharge train of third LAGES facility embodiment according to the invented method.

The general operation principles of discharge (DCH) train 300 are illustrated with the FIG. 3. As described above, delivering the low-pressure LNG for re-gasification into CH train 200 of the LAES facility is performed by a pump 101 from the storage tank 102 only during LAES discharge. At the same time, delivering the high-pressure NG from the CH train 200 via pipe 109 is performed continuously at the periods of high and low demands for grid power. In the latter case the control valve 112 is directed the entire NG stream through odorizer 117 to main pipeline 111 of the NO network. During LAES discharge up to 33% of the high-pressure NG delivered from the CH train is directed via pipe 113 to its re-liquefaction in the re-liquefier 302. Here the heat transfer between the high-pressure NG stream and a stream of high-pressure liquid air delivered from the CH train 200 via pipe 301 takes place, resulting in re-liquefaction of NG stream and re-gasification of liquid air stream. The following depressurization of re-liquefied NG in liquid gas expander 114 makes possible to install at expander outlet such LNG pressure, at which it may be returned to storage 102 via pipe 15 or used for loading the trucks 116. By this means the invented method makes possible to profitably use a cold thermal energy of LNG fuel for the energy storage purposes before usage of this fuel in the road or marine transport.

The re-gasified liquid air escaped the NG re-liquefier 302 as a high-pressure air is superheated in the recuperator 307 by LAES exhaust and partially expanded in the high-pressure (HP) expander 308 down to a pressure required for supercharging the reciprocating engine 310 by combustion air. A gaseous fuel delivered into this engine via pipe 304 is converted here into useful power 305 and a stream of exhaust gases 311 escaped the engine at the enhanced pressure and temperature. This temperature may be optionally increased through combustion of an additional fuel in the duct burner 312. The following expansion of exhaust gases in the low-pressure (LP) expander 313 down to atmospheric pressure is accompanied by reducing their outlet temperature, which however is sufficient to provide a said superheating of the high-pressure air in the recuperator 307. The finally cooled exhaust gases are removed into atmosphere via pipe 306. The use of pressurized supplementary firing in the exhaust of DCH train 300 leads to an increase in temperature of exhaust and air streams at the inlet of expanders 313 and 308 and to corresponding increase in their power outputs. These outputs add up to ~50% of the LAES facility discharge output. Another one-half facility output provides the reciprocating gas engine 310. It should be equipped with intercooler 309 of combustion air, if duct burner 312 is installed.

During possible operation of the LAGES facility in base-load regime the low-pressure LNG is continuously (24 h/d) sent to the deep cooler 103 and a control valve 104 directs the entire deeply cooled LNG stream through a high-pressure pump 105 to CH train 200 for re-gasification of this LNG. In its turn, production of liquid air is performed also on 24 h/d basis and a control valve 205 instantly directs the produced liquid air through a high-pressure pump 208 and deep cooler 103 to the DCH train 300. Here it is firstly used in the device 302 for re-liquefaction of a part of high-pressure NG delivered via pipe 113 from the outlet of CH train 200 and then for generation of discharged power in the DCH train 300. By this means the storages of deeply cooled LNG 106 and liquid air 206 are taken out of service in this regime of LAGES base-load operation.

INDUSTRIAL APPLICABILITY

The developed method for the Liquid Air and Gas Energy Storage (LAGES) is a novel integration between the processes in Liquid Air Energy Storage (LAES) facility and LNG Storage and Re-gasification (LNGSR) terminal. At a sacrifice of exchanging the waste energy flows between two facilities a need for any vaporizers, sea water and/or fuel commonly used to vaporize LNG at the terminal could be fully obviated simultaneously with a drastic reduction in losses during energy converting at the LAES facility. A re-counted round-trip efficiency of such energy storage could exceed 150% with a capability for co-production of re-gasified NG and above 70 MW of peaking power per each MTPA of terminal sent-out capacity. The use of the reciprocating engine during discharging the LAES facility makes possible not only to halve an amount of liquid air required for on-peak production of a given power, but also to highly profitably and simply recover an exhaust thermal energy of such engine. In addition, a waste cold thermal energy of the discharged air may be used for re-liquefying a part of send-out NG at a rate of 16-33% of send-out terminal capacity. The re-liquefied NG may be used for loading the trucks and ship bunkering or returned into storage tanks for a corresponding increase in total amount of electrical energy (in MWh) which may be produced at a given terminal send-out capacity.

The performances of LAGES facility using the proposed method of operation are tabulated below. The calculation of these performances has been performed for the case of a possible integration between the LNGSR terminal having ~0.43 MTPA of capacity and the LAES system with installed ~33 MW of peaking power output. At such LAGES facility the LNG re-gasification and production of liquid air in the charge (CH) train of the LAES system is performed continuously 24 h per day and on condition that relationship between the flow-rates of LNG (pure methane) and charging air streams is equal to 1.1:1. The discharge of LAES system is run on a daily basis during 12 on-peak hours, for which purpose the liquid air produced at that instant and during off-peak hours is used.

In so doing, the low pressure of LNG stream and the high pressure of resulting NG stream are set at the levels of 6 and 80 barA correspondingly, whereas a top cycle pressure of process air stream and a pressure of pumped discharged air stream are set at a level of 67 barA and 140 barA correspondingly. Amount of fuel combusted in the duct burner of the discharge (DCH) train of LAES system provides the admissible temperatures of gaseous streams at the inlet of turbomachinery used: ~540° C. for discharged air at the inlet of the modified steam turbine being used as HP expander and ~760° C. for exhaust gases at the inlet of power turbine being used as LP expander. Finally, a DCH train comprises a set of two reciprocating gas engines, being charged with combustion air from the CH train at a pressure of ~4 barA. The DCH train of LAES system provides simple and effective harnessing the potential and thermal energy of their exhaust gases escaping the engines at a pressure of ~3.5 barA and a temperature of ~570° C.

A power required for operation of the CH train during off-peak hours is delivered from the grid, whereas during on-peak hours it is extracted from the gross DCH train output, resulting in corresponding decrease in net discharged power delivered into grid. Taking into account the chosen identical durations of the off-peak and on-peak hours, the grid round-trip efficiency (RTE) of the LAGES system may by determined from a simple division of its net discharge power by the charge one.

The gross discharge power produced by the HP and LP expanders and reciprocating engines is the sum of a power produced by the discharged air delivered from CH train to DCH one and an extra power, produced with help of fuel self-consumed by the engines and in the duct burner of the DCH train. If this fuel would be alternatively consumed by a much used simple cycle peaking gas turbine, a grid power equivalent of the consumed fuel could be equal to a fuel thermal equivalent multiplied by average fuel-to-power conversion efficiency at the peaking gas turbine plant. By this means net actual (re-counted) discharge power of LAGES facility may be determined by subtraction of a grid power equivalent of fuel self-consumed at this facility from its net discharge power output. A re-counted RTE value for the developed LAGES facility is determined by division of its net re-counted discharge power by charge one. The main data of LAGES facility operated in the energy storage regime are presented below in the Table 1.

TABLE 1

| | | UNIT | DATA |
|---|---|---|---|
| | LNG PROCESSING DATA | | |
| 1 | Time-period of LNG delivery and deep cooling | h/d | 12 |
| 2 | Mass flow-rate of LNG delivered | kg/s | 33 |
| 3 | Low pressure of LNG delivered | barA | 6 |
| 4 | Temperature of LP LNG delivered | ° C. | −158.8 |
| 5 | Temperature of HP deeply cooled LNG | ° C. | −170.4 |
| 6 | LNG service tank for 12 h storage (P = 1.5 bar, T = −173 ° C.) | m^3 | 1,584 |
| 7 | Time-period of LNG re-gasification in the LAES system | h/d | 24 |
| 8 | Mass flow-rate of the whole of re-gasified LNG | kg/s | 16.5 |
| 9 | Pressure of re-gasified LNG | barA | 79.5 |
| 10 | Temperature of re-gasified LNG | ° C. | 15 |
| 11 | Time-period of NG re-liquefaction in the LAES system | h/d | 12 |
| 12 | Minimum mass flow-rate of re-liquefied NG | kg/s | 5.5 |
| 13 | Maximum mass flow-rate of re-liquefied NG | kg/s | 11.0 |
| 14 | Pressure of re-liquefied NG | barA | 1.4 |
| 15 | Temperature of re-liquefied NG | ° C. | −159.1 |
| 16 | Maximum NG send-out capacity | MTPA | 0.428 |
| 17 | Minimum re-liquefying capacity | MTPA | 0.085 |
| 18 | Minimum NG send-out capacity | MTPA | 0.342 |
| 19 | Maximum re-liquefying capacity | MTPA | 0.171 |
| | LAES CHARGE (CH) PROCESS PARAMETERS | | |
| 20 | Daily duration of grid power consumption | h/d | 12 |
| 21 | Daily duration of self-produced power consumption | h/d | 12 |
| 22 | Process air flow-rate | kg/s | 19.3 |

TABLE 1-continued

| | | UNIT | DATA |
|---|---|---|---|
| 23 | Liquid air (LAIR) production rate | kg/s | 15.1 |
| 24 | Air pressure at feed air compressor outlet | barA | 8.4 |
| 25 | Air temperature at the intercoolers outlet | ° C. | 10 |
| 26 | Air pressure at process air compressor outlet | barA | 67.5 |
| 27 | Air liquefaction ratio | % | 78.2 |
| 28 | Charge (CH) power consumption | MWE | 9.2 |
| 29 | LAIR tank for 12 h storage (P = 1.05 barA, T = −194.2 ° C.) | m^3 | 746 |
| 30 | LNG re-gasified-to-AIR liquefied ratio | kg/kg | 1.09 |
| 31 | LAIR pressure at the outlet of HP pump | barA | 140.5 |
| 32 | LAIR temperatures at outlet of HP pump/LNG deep cooler | ° C. | −189/−161 |
| | LAES DISCHARGE (DCH) PROCESS PARAMETERS | | |
| 33 | Daily time-period of the LAES discharge | h/d | 12 |
| 34 | LAIR consumption rate | kg/s | 30.2 |
| 35 | Gross DCH power output with fuel consumption | MWe | 41.4 |
| 36 | Net DCH power with fuel consumption | MWe | 32.2 |
| 37 | Mass flow-rate of NG self-consumed | kg/s | 1.012 |
| 38 | Annual amount of NG self-consumed | MTPA | 0.0157 |
| 39 | NG self-consumption as share of net send-out capacity (SOC) | % | 3.7 |
| 40 | Thermal input with fuel self-consumed | MWth | 49.2 |
| 41 | DCH power w/o fuel consumption | MWe | 6.4 |
| 42 | Fuel-to-extra power conversion efficiency | % | 71 |
| | SPECIFIC LAGES PARAMETERS | | |
| 43 | Specific CH energy input | kWh/t LAIR | 169 |
| 44 | Specific gross DCH energy output | kWh/t LAIR | 381 |
| 45 | Specific CH power relative to max SOC | MWe/MTPA | 21.5 |
| 46 | Specific net DCH power relative to max SOC | MWe/MTPA | 75.2 |
| 47 | Specific net DCH power relative to min SOC | MWe/MTPA | 94.2 |
| | GRID and RE-COUNTED ROUND-TRIP EFFICIENCY | | |
| 48 | Grid RTE of the LAES facility | % | 350 |
| 49 | Assumed average grid fuel-to-power conversion efficiency | % | 33 |
| 50 | Grid power equivalent to fuel self-consumed | MWe | 16.2 |
| 51 | Net re-counted DCH power produced | MWe | 16.0 |
| 52 | Re-counted RTE of the LAES facility | % | 174 |

A flexibility of the proposed LAGES facility design makes possible to operate it also in the regime of base-load cogeneration plant. As indicated in the mentioned "Handbook of Liquefied Natural Gas" (pp. 37-46), about 20% of the today's import terminals are equipped with the submerged combustion vaporizers, consuming approximately 1.5% of the total vaporized LNG as fuel. Use of the LAES waste heat for the LNG re-gasification provides a saving of significant operating cost to the terminals integrated with the LAES facilities.

For analysis of this option it is assumed that the LNG is continuously (24 h/d) delivered through one of the two (2×50%) sections of the deep cooler into the CH train and subjected to re-gasification through heat exchange with process air being liquefied. Two-thirds of re-gasified LNG is directed to NG main pipeline, whereas one-third is directed to DCH train for re-liquefaction. The produced liquid air is instantly used together with fuel in the DCH train for production of discharged power, a part of which is used for driving the compressors of the CH train. By this means, the LAGES operation in base-load regime obviates a need for usage of liquid air and deeply cooled LNG storage tanks. As evident from the data of Table 2 total efficiency of the LAGES facility in cogeneration mode is about 80%.

TABLE 2

| | UNIT | DATA |
|---|---|---|
| LNG PROCESSING PARAMETERS | | |
| 1 Time-period of LNG delivery and deep cooling | h/d | 24 |
| 2 Mass flow-rate of LNG delivered | kg/s | 16.5 |
| 3 Low pressure of LNG delivered | barA | 6 |
| 4 Temperature of LP LNG delivered | ° C. | −158.8 |
| 5 Temperature of HP deeply cooled LNG | ° C. | −170.4 |
| 6 Time-period of LNG re-gasification in the LAES system | h/d | 24 |
| 7 Mass flow-rate of the whole of re-gasified LNG | kg/s | 16.5 |
| 8 Pressure of re-gasified LNG | barA | 79.5 |
| 9 Temperature of re-gasified LNG | ° C. | 15 |
| 10 Time-period of NG re-liquefaction in the LAES system | h/d | 24 |
| 11 Mass flow-rate of re-liquefied NG | kg/s | 5.5 |
| 12 Pressure of re-liquefied NG | barA | 1.4 |
| 13 Temperature of re-liquefied NG | ° C. | −159.1 |

TABLE 2-continued

| | UNIT | DATA |
|---|---|---|
| 14 NG send-out capacity | MTPA | 0.342 |
| 15 Re-liquefying capacity | MTPA | 0.171 |
| LIQUID AIR PRODUCTION PARAMETERS | | |
| 16 Time-period of LAIR production with power consumption | h/d | 24 |
| 17 Process air flow-rate | kg/s | 19.3 |
| 18 Liquid air (LAIR) production rate | kg/s | 15.1 |
| 19 Air pressure at feed air compressor outlet | barA | 8.4 |
| 20 Air temperature at the intercoolers outlet | °C. | 10 |
| 21 Air pressure at process air compressor outlet | barA | 67.5 |
| 22 Air liquefaction ratio | % | 78.2 |
| 23 Power consumption by CH train | MWe | 9.2 |
| 24 LAIR temperature at the CH train outlet | °C. | −194.2 |
| 25 LNG re-gasified-to-AIR liquefied ratio | kg/kg | 1.09 |
| 26 LAIR pressure at the outlet of HP pump | barA | 140.5 |
| 27 LAIR temperatures at outlet of HP pump/deep cooler | °C. | −189/−161 |
| 28 Daily time-period of the LAES discharge | h/d | 24 |
| 29 LAIR consumption rate | kg/s | 15.1 |
| 30 DCH power output | MWe | 20.7 |
| 31 Mass flow-rate of NG self-consumed in DCH train | kg/s | 0.506 |
| 32 Thermal input with fuel self-consumed in DCH train | MWth | 24.6 |
| 33 Annual NG self-consumption | MTPA | 0.0157 |
| 34 A share of LNG self-consumption | % | 3 |
| LAGES EFFICIENCY in BASE-LOAD CHP MODE | | |
| 35 Assumed saving in fuel self-consumed for LNG re-gasification | % | 1. |
| 36 Total power of LAGES facility for LNG re-gasification | MWth | 8.2 |
| 37 Power output of LAGES facility (to electric grid) | MWe | 11.5 |
| 38 Total efficiency of LAGES facility in base-load CHP mode | % | 79.3 |

It should be noted that the term "comprising" does not exclude other elements or steps and "a" or "an" do not exclude a plurality. It should also be noted that reference signs in the claims should not apparent to one of skill in the art that many changes and modifications can be effected to the above embodiments while remaining within the spirit and scope of the present invention. For example, the invented method may be applied to design and operation of the near-shore Floating Storage and Re-gasification Units (FSRU) connected with the national electric and natural gas networks.

What is claimed as new is:

1. A method for a liquid air and gas energy storage (LAGES) comprising in combination: delivering a liquefied natural gas (LNG) from a tank of a LNG Storage and Re-gasification (LNGSR) terminal into a co-located Liquid Air Energy Storage (LAES) facility for continuous re-gasifying the LNG at said LAES facility and final injecting a produced high-pressure natural gas (NG) into a transmission pipeline;
  interchanging a waste thermal energy between the LNG being re-gasified and a process air being continuously liquefied at the LAES facility;
  round-the-clock charging said LAES facility through consuming a grid power for continuous production of a liquid air with storing said liquid air only at the periods of a low demand for the grid power;
  discharging the LAES facility, resulting in generating the grid power at the periods of a high demand for said grid power through consuming the liquid air both produced at said periods and stored at the LAES facility at the periods of the low demand for the grid power; and
  wherein the improvements comprise in combination:
  delivering the LNG from the LNGSR terminal at a low pressure and a first low temperature during discharging the LAES facility;
  deep cooling a delivered LNG down to a second low temperature through recovering a minor part of a cold thermal energy of the liquid air consumed during discharging the LAES facility;
  controlled dividing a deeply cooled LNG into two parts, a first of which is immediately pumped at a high pressure and re-gasified at the LAES facility thus, forming the high-pressure NG produced during discharging said LAES facility;
  re-liquefying a portion of the high-pressure NG through recovering a major part of the cold thermal energy of the liquid air consumed during discharging the LAES facility;
  depressurizing and recycling at least a part of a re-liquefied NO into the tank of the LNGSR terminal;
  storing a second part of the deeply cooled LNG at said low pressure and said second low temperature at the periods of the high demand for the grid power; and
  pumping the second part of the deeply cooled LNG at said high pressure and re-gasifying it at the LAES facility thus, forming the high-pressure NG produced at the periods of the low demand for the grid power.

2. A method for the liquid air and gas energy storage as in claim 1, wherein a relationship between the mass flowrates of said LNG being re-gasified and said liquid air being produced at the LAES facility is maintained in the range of (1.05-1.15):1, whereas a share of the re-liquefied NG is provided in the range of 15-35% of a total amount of the high-pressure NG produced during charging said LAES facility.

3. A method for the liquid air and gas energy storage as in claim 1, further comprising the following steps of said charging the LAES facility:
  compressing a feed air stream up to an intermediate charge cycle pressure in at least a two-stage feed air compressor set with extracting a compression heat in an intercooler and an aftercooler of said feed air compressor;
  cleaning a pressurized feed air stream from the atmospheric water vapor and carbon dioxide components thus, forming a cleaned feed air stream;

compressing a recirculating air stream in an uncooled recirculating air compressor set up to said intermediate charge cycle pressure;

forming a stream of the process air through mixing the streams of the cleaned feed and the recirculating air at the intermediate charge cycle pressure;

following compressing the process air stream up to a top charge cycle pressure in at least a two-stage process air compressor set with extracting the compression heat in an intercooler of said process air compressor;

liquefying the process air stream by the deeply cooled LNG, resulting in re-gasifying the LNG and forming the high-pressure NG;

following cooling a liquefied process air by the stream of the recirculating air escaped a liquid air separator;

final cooling and depressurizing the liquefied process air in a liquid air expander, resulting in formation of a two-phase process air stream escaped said liquid air expander at a bottom charge cycle temperature and a bottom charge cycle pressure;

separating the vapor and liquid phases of the two-phase process air in the liquid air separator thus, forming the streams of the recirculating air and the liquid air;

storing the liquid air in a LAES facility tank at the periods of the low demand for the grid power or immediately consuming it at the periods of the high demand for the grid power; and collecting the extracted compression heat by an intermediate cooling medium circulating through said intercoolers and said aftercooler placed in parallel with following recovering a collected compression heat for the LACES' own needs.

4. A method for the liquid air and gas energy storage as in claim 3, wherein the collected compression heat is recovered for preheating the high-pressure NG prior to injecting said NG into a transmission pipeline.

5. A method for the liquid air and gas energy storage as in claim 1, further comprising the following steps of said discharging the LAES facility:

consuming the liquid air delivered immediately from said liquid air separator and from the LAES facility tank with pumping said liquid air up to a top discharge cycle pressure;

recovering the minor part of the cold thermal energy of the consumed liquid air for said deep cooling the delivered LNG down to the second low temperature, resulting in heating the consumed liquid air;

recovering the major part of the cold thermal energy of the consumed liquid air for said re-liquefying the portion of the high-pressure NG, resulting in further heating and re-gasifying the consumed liquid air with forming a re-gasified air at the top discharge cycle pressure;

final heating the re-gasified air by an exhaust gas escaped the LAES facility;

partial expanding the re-gasified air in a high-pressure work-performing expander, resulting in generating a first part of the grid power;

cooling the partially expanded re-gasified air and using it for supercharging a fueled reciprocating gas engine installed downstream of said high-pressure expander and for burning a fuel in said gas engine;

operating the gas engine, resulting in generating a second part of the grid power and releasing the exhaust gas at an enhanced pressure and an enhanced temperature;

further controlling the enhanced temperature of the exhaust gas at the inlet of a downstream installed low-pressure work-performing expander at a level equal to or exceeding a value of the enhanced temperature of the released exhaust gas;

expanding the exhaust gas in said low-pressure work-performing expander, resulting in generating a third part of the grid power;

recovering a waste thermal energy of the exhaust gas escaped said low-pressure expander for the final heating the re-gasified air; and releasing the exhaust gas into the atmosphere.

6. A method for the liquid air and gas energy storage as in claim 5, wherein controlling the enhanced temperature of said exhaust gas at the inlet of said low-pressure expander is performed through burning an additional fuel in a stream of said exhaust gas released from the gas engine.

* * * * *